(12) United States Patent
Daton-Lovett

(10) Patent No.: US 6,256,938 B1
(45) Date of Patent: Jul. 10, 2001

(54) ELONGATE HOLLOW ELEMENT

(75) Inventor: Andrew J. Daton-Lovett, Wolverton (GB)

(73) Assignee: Rolatube Technology Limited (GB)

( * ) Notice: Subject to any disclaimer, the term of this patent is extended or adjusted under 35 U.S.C. 154(b) by 0 days.

(21) Appl. No.: 08/474,195

(22) Filed: Jun. 7, 1995

Related U.S. Application Data

(63) Continuation of application No. 08/239,844, filed on May 9, 1994, now abandoned, which is a continuation of application No. 08/104,940, filed on Aug. 12, 1993, now abandoned, which is a continuation of application No. 08/012,809, filed on Feb. 2, 1993, now abandoned, which is a continuation of application No. 07/435,380, filed on Dec. 18, 1989, now abandoned.

(30) Foreign Application Priority Data

Apr. 30, 1987 (GB) .................................................. 8710332

(51) Int. Cl.⁷ ................................................. E04H 12/02
(52) U.S. Cl. ........................... 52/108; 138/119; 138/128; 138/137; 138/151
(58) Field of Search .............................. 52/108; 138/119, 138/128, 137, 151; 2421/54 A, 55

(56) References Cited

U.S. PATENT DOCUMENTS

| | | | |
|---|---|---|---|
| 3,144,104 | * | 8/1964 | Weir et al. ............................. 52/108 |
| 3,144,215 | * | 8/1964 | Klein .................................. 52/108 X |
| 3,177,987 | * | 4/1965 | Swaim ................................... 52/108 |
| 3,357,457 | * | 12/1967 | Myer .................................. 52/108 X |
| 3,360,894 | * | 1/1968 | Sharman et al. ............... 242/54 A X |
| 3,361,377 | * | 1/1968 | Trexler, Jr. ........................ 52/108 X |
| 3,387,414 | | 6/1968 | Adams . |
| 3,434,674 | * | 3/1969 | Groskopfs .......................... 242/54 A |
| 3,543,806 | * | 12/1970 | Rushing .............................. 52/108 X |
| 3,608,844 | * | 9/1971 | Tumulty, Jr. ....................... 52/108 X |
| 3,696,568 | * | 10/1972 | Berry .................................... 52/108 |
| 3,811,633 | * | 5/1974 | Cummings et al. ............... 242/54 A |
| 3,832,240 | | 8/1974 | Kubo . |
| 4,225,871 | | 9/1980 | Ramari . |
| 4,265,690 | | 5/1981 | Lowenhar . |
| 4,991,784 | * | 2/1991 | Schmid .......................... 242/54 A X |

* cited by examiner

*Primary Examiner*—Carl D. Friedman
*Assistant Examiner*—Yvonne M. Horton
(74) *Attorney, Agent, or Firm*—Nixon & Vanderhye PC

(57) ABSTRACT

An elongate element in the form of a longitudinally split tube (2) is arranged to be progressively flattened and wound about an axis (6) extending transversely to the longitudinal extent of the tube to form a coil (4). To enable the tube (2) to be structurally rigid, but yet to enable it to be easy to wind and to remain coiled without being potentially explosive, a second layer (10, 12, 14 or 16) is affixed to the layer of spring steel (8) forming the tube (2). The second layer is arranged to be stressed to oppose the bias of the spring steel (8) which favours the formation of the tube.

21 Claims, 4 Drawing Sheets

ELONGATE HOLLOW ELEMENT

Figure 1:
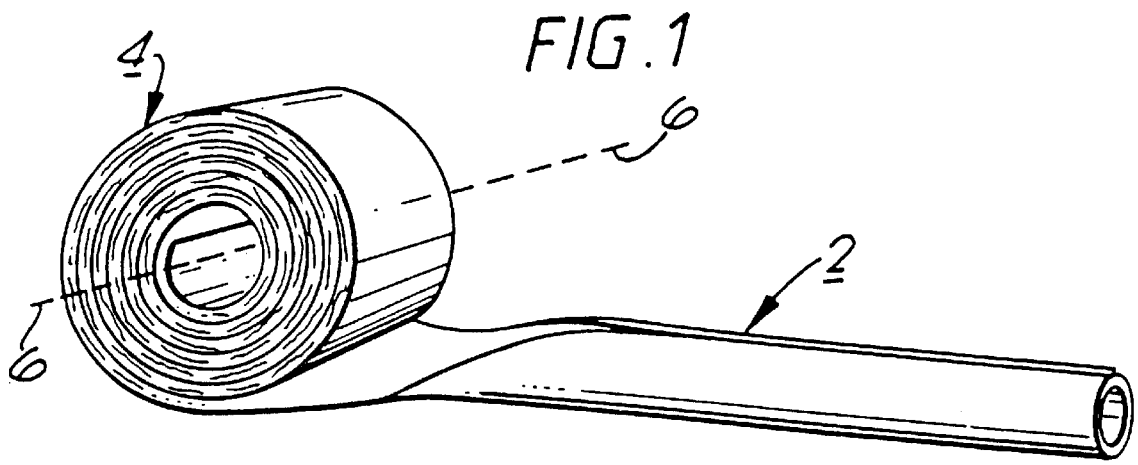

This is a continuation of application Ser. No. 08/239,844, filed May 9, 1994, which was abandoned upon the filing hereof which was a CON of Ser. No. 08/104,940, filed Aug. 12, 1993, now abandoned, which was a CON of Ser. No. 08/012,809, filed Feb. 2, 1993, now abandoned, which was a CON of Ser. No. 07/435,380, filed Dec. 18, 1989 now abandoned.

The present invention relates to an elongate hollow element arranged to be progressively flattened and wound into a compressed condition about one or more axes extending transversely relative to the longitudinal extent of the element.

It has long been suggested that self-supporting extensible tubes arranged to be stored in a compact coiled form would be useful for many applications. For example, U.S. Pat. No. 3,144,104 shows such a tube made of a resilient material such as spring steel or beryllium copper which is arranged to be wound onto a drum.

However, although there have been many proposals for such elements, currently no such elements are available in practice.

In seeking to make an element of this general kind it is necessary to make the material of the element thicker and more strongly prestressed towards its tubular form if it is to be sufficiently strong to resist bending loads when in its tubular form. However, the energy then required to flatten and wind-up the element becomes excessive. Because the elements are generally made of resilient metal, it has also been necessary to provide drums and the like to wind-up the element so that the user is not cut thereby. Furthermore, the potential energy stored by the coiled device is considerable and is a source of real potential danger. Thus, if the housing or other means holding the coil in position should break, this potential energy can be released explosively with consequent danger of serious injury. There is also a risk of injury when the element is being used normally as, when it is released from its coiled form, it may return to its tubular form at an explosive rate.

The present invention seeks to provide an elongate hollow element in which the disadvantages and risks outlined above are reduced.

According to the present invention there is provided an elongate hollow element arranged to be progressively flattened and wound into a compressed condition about one or more axes extending transversely relative to the longitudinal extent of the element, wherein said element comprises a substrate which is resilient and is biased towards said elongate hollow form, and means affixed to said substrate and arranged to oppose the bias of said substrate, and wherein the elongate hollow form and the compressed condition of said element are reversible.

As the means affixed to the substrate oppose the bias of the substrate, these means tend to favour the formation of the compressed condition of the element. By this means, the build-up of potential energy in the compressed condition is opposed, and may even be eliminated. Not only does this enable very strong elements to be safely stored in the coiled state, it also enables the safe release of the element to assume its elongate hollow form. Surprisingly, it has also been found that the invention enables such elements to be repeatedly easily wound and subsequently restored to their elongate hollow form.

It would be possible to wind the element into its compressed condition about a plurality of transverse axes, for example to form a concertina-like compact structure. However, for most applications it is preferred that the element be wound to form a coil having either a circular or a substantially rectangular shaped periphery.

Preferably, in its elongate hollow form, the element has sufficient rigidity to be self-supporting. Indeed, the element can be extended very readily from the compressed condition to the length required and the extended portion can be made to exhibit considerable structural rigidity.

In an embodiment, the means affixed to the substrate to oppose the bias of the substrate comprises a layer of a material which is subject to plastic deformation, for example to a layer of a plastics material laminated with the substrate. Thus, when the element is in its elongate hollow form, said layer can be arranged to be tensioned transversely of the element to oppose the curving of the element. In addition, winding of the element to its compressed condition deforms the plastics material to take up that position and thereby oppose the return of the material to its elongate hollow form.

Additionally or alternatively, the means affixed to the substrate may comprise prestressing means prestressed longitudinally of the element to favour formation of the compressed condition.

For example, the prestressing means may comprise at least one member extending longitudinally of the element which is under tension when the element is in its elongate hollow form, but which tension is arranged to be at least partially relieved when the element adopts its compressed condition. These prestressing means may comprise longitudinally extending prestressed fibres of glass or carbon. Such fibres may be embedded in a layer of plastics material laminated with said substrate.

Alternatively, the prestressing means may comprise longitudinally extending bands of prestressed rubber or plastics material.

Additionally and/or alternatively, means may be provided on the substrate prestressed transversely of the element to oppose curving of the flattened element into its elongate hollow form.

In an embodiment, said means opposing curving of the element may comprise members extending transversely of the element which are under tension when the element is in its elongate hollow form but whose tension is at least partially relieved when the element is flattened. For example, these transversely extending members maybe prestressed fibres, such as glass or carbon fibres. These fibres may similarly be embedded in a layer of plastics material laminated with said substrate.

Said transversely extending members may alternatively be elongate strips of resilient material, for example, of mesh or spring metal.

Said substrate may be a strip of spring metal, for example, spring steel or beryllium copper or may be a mesh of these materials. The use of a mesh substrate laminated to one or more plastic material layers is particularly favoured where the elongate hollow element is intended for repeated winding into and out of its compressed condition.

The cross-sectional shape of the elongate hollow element is generally curved to provide the necessary structural rigidity, but otherwise may be of any shape required. For example, the element may have a shallow arcuate form or it may be a closed tube of either circular or oval cross-section.

In one embodiment where the element is in the form of a longitudinally split tube, co-operable means may be provided on the adjacent longitudinally extending edges of the tube and arranged to releasably secure said edges together. In this way, the element in its elongate hollow form provides a tube.

In an embodiment the co-operable means comprise a longitudinally extending recess formed in one of the edges and a corresponding longitudinally extending projection on the other of said edges. Preferably, co-operating surfaces of said recess and projection are also formed with interengaging means.

In an embodiment, longitudinally extending formations, such as grooves or ribs, are formed on the element to increase its resistance to bending loads.

The present invention also extends to a portable structural element comprising a housing, and an elongate hollow element as defined above wound into its compressed condition and received within the housing.

Elongate elements of the invention may be used to make pipes, conduits, extensible arms, masts, tent supports, probes and aerials. In addition, means may be provided for driving the element from its compressed condition to its elongate hollow form and back again.

Figure 2:
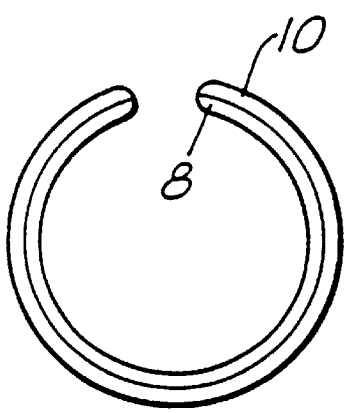
Figure 3:
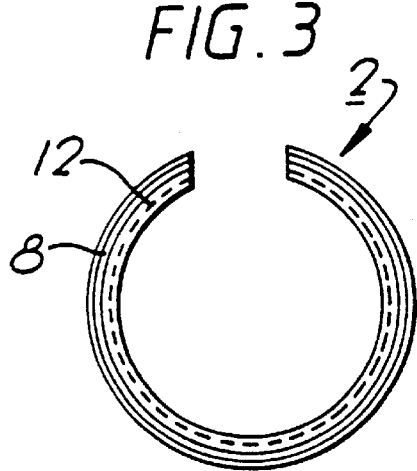
Figure 4:
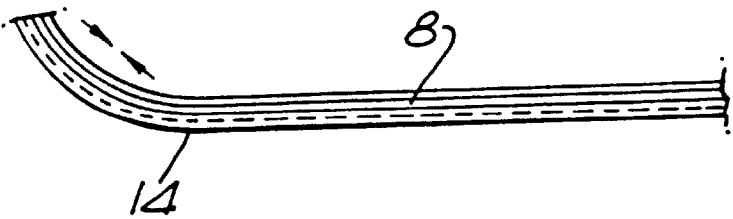
Figure 5:
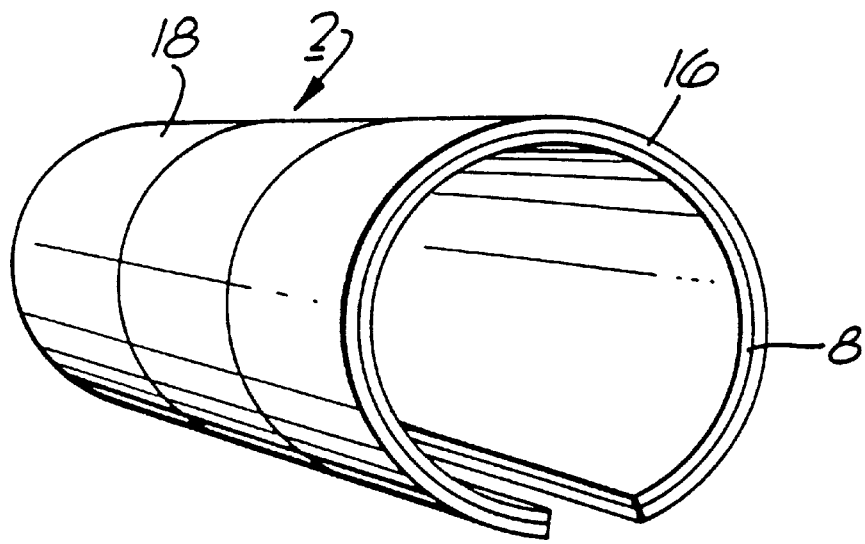
Figure 6:
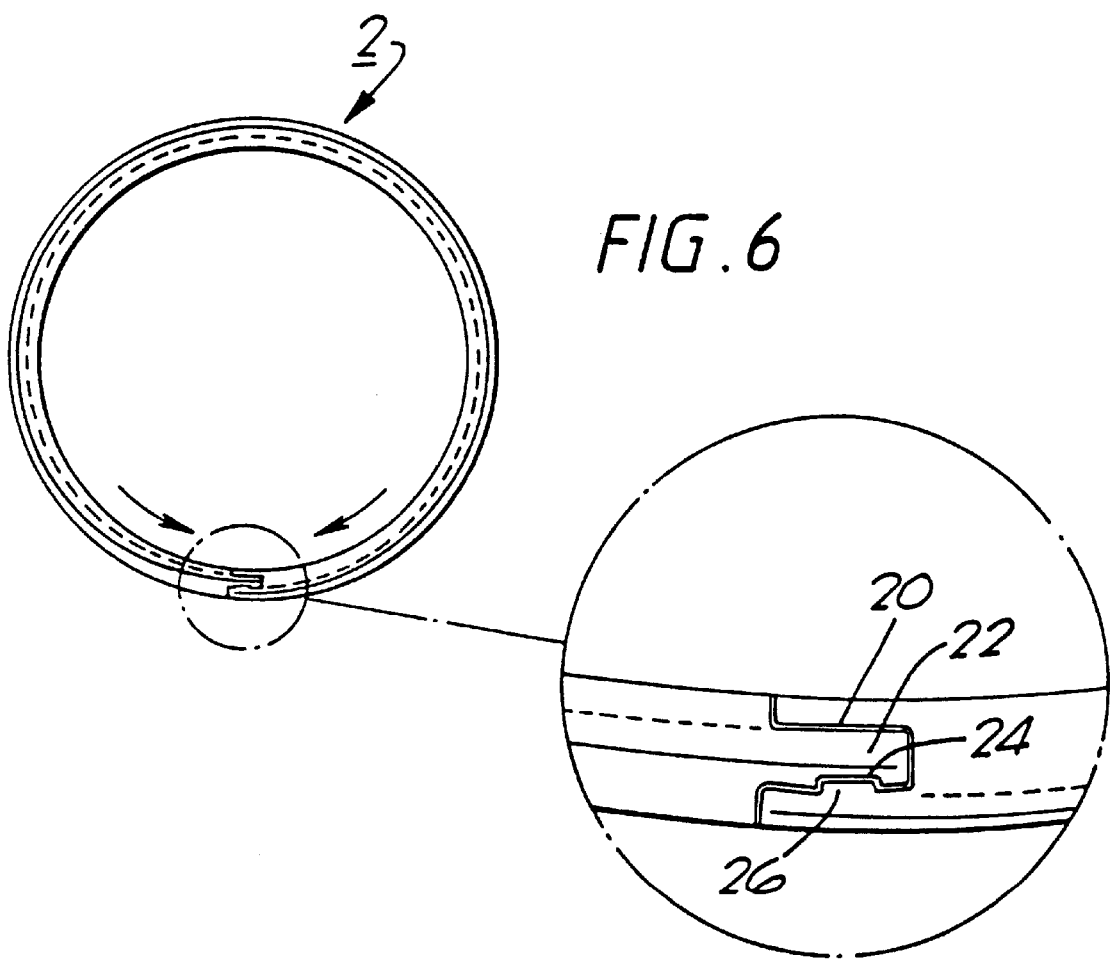
Figure 7:
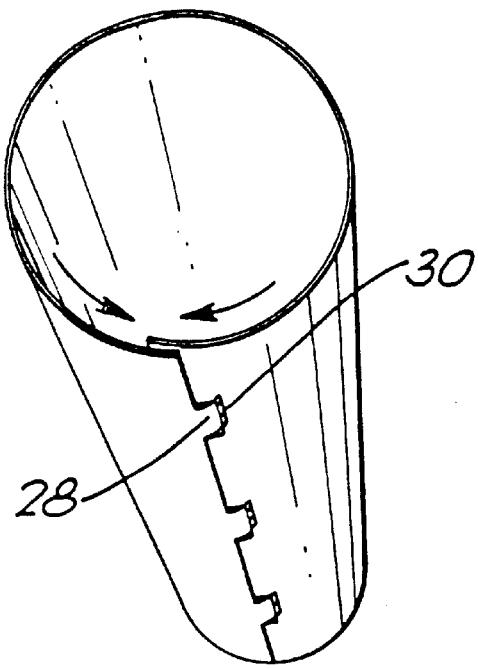
Figure 8:
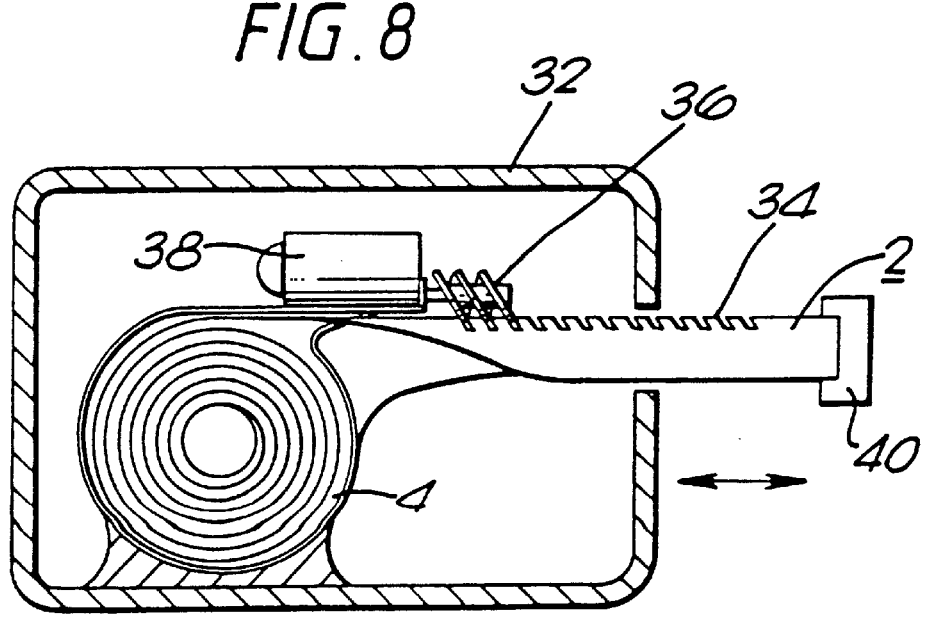
Figure 9A:
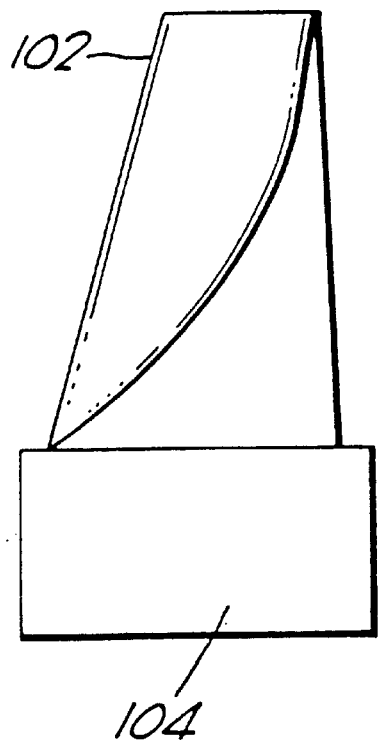
Figure 9B:
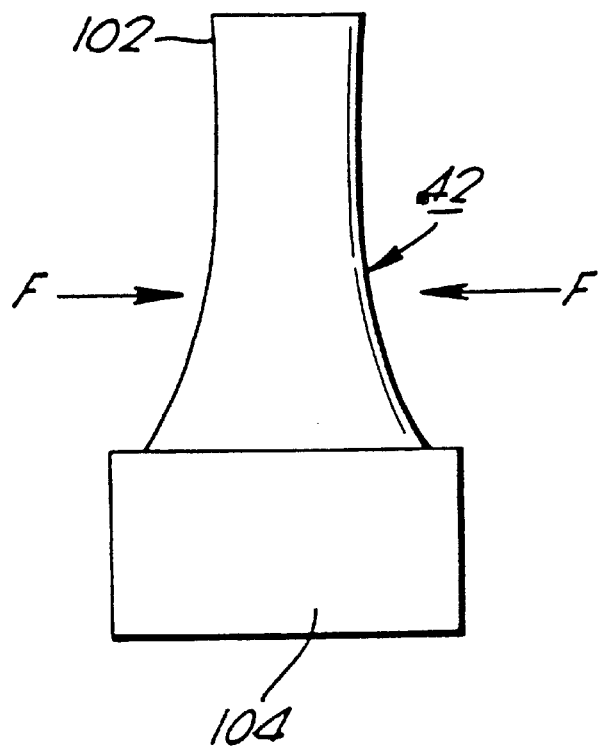
Figure 9C:
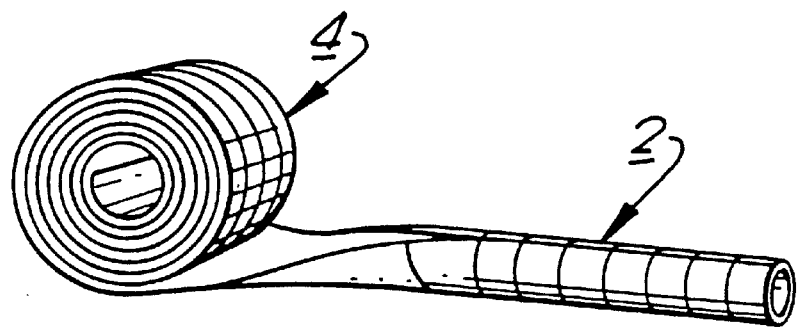

Embodiments of the present invention will hereinafter be described, by way of example, with reference to the accompanying drawings, in which:

FIG. 1 shows a perspective view of an embodiment of an elongate element of the invention illustrating the winding of the element to form a coil, FIG. 2 shows a cross-section of the element of FIG. 1 in its extended form, FIG. 3 shows a cross-section of an alternative embodiment of an elongate element in its extended form, FIG. 4 shows a partial longitudinal section of the element of FIG. 3, FIG. 5 shows a perspective view of an alternative embodiment of an elongate element of the invention, FIG. 6 shows a cross-section in its extended form of a further embodiment of an elongate element having means for interconnecting its longitudinal edges, FIG. 7 shows a perspective view of a still further embodiment of an elongate element showing alternative interconnecting means for its longitudinal edges, FIG. 8 shows a section of a portable structural element in which a coiled elongate element is received within a housing, FIGS. 9a and 9b show schematically a coiled element from above illustrating the problems encountered when trying to extend the element linearly, and FIG. 9c shows schematically a perspective view of an elongate element arranged to be driven to be extended linearly.

FIG. 1 shows a perspective view of an elongate hollow element 2, which can be progressively flattened and wound about an axis 6, extending transversely relative to the longitudinal extent of the element, to form a coil 4. FIG. 2 shows a cross-section through the elongate element 2, when it is in its extended, elongate hollow form.

The element shown in FIGS. 1 and 2 comprises an elongate substrate 8, made from a resilient material, for example, made of spring metal or a mesh. The substrate 8 is preformed such that it is biased to its extended, elongate form as shown in FIG. 2 in which it forms an elongate, longitudinally split tube having substantially circular cross-section. A layer 10 of a plastics material is laminated to the outer surface of the substrate 8. The plastics material of the layer 10 is subject to plastic deformation at ambient temperatures.

The tube 2 can be wound to form the coil 4 by progressively flattening out the tube against the bias of the substrate 8, and then rolling the material about the axis 6 which extends transversely relative to the longitudinal extent of the tube. It will be appreciated that the winding of the tube to form the coil 4 also has to be performed against the bias of the substrate 8. The tube is held in its coiled state by appropriate means (not shown).

As the tube is coiled, the plastics material of the layer 10 undergoes plastic deformation such that the layer 10 becomes biased in favour of the coiled form of the element. Accordingly, in the coiled state the plastics material layer 10 is opposing, or even negating, the potential energy which has been stored in the substrate 8 in the formation of the coil. This renders the coil much more stable than a comparable coil made from the substrate alone and makes it possible for very strong spring substrates to be coiled with safety. Furthermore, when it is required to unroll the coil to reform the tube 2, this has to be done by the substrate against the bias of the deformed plastics material layer 10. This ensures that the tube is not explosively released.

As the tube 2 is reformed, the plastics material 10 becomes tensioned transversely of the tube 2. This provides stability to the tubular form which has sufficient rigidity to be self-supporting. Furthermore, as flattening the tube 2 relieves this tension of the layer 10, the transversely tensioned layer is effectively opposing the curving of the substrate 8 in accordance with its bias, and therefore aids in the rolling of the coil 4 against this bias. In fact, it has been found that the provision of a laminated tube 2 as shown in FIGS. 1 and 2 enables very strong tubes to be produced which can be easily and safely coiled when required. However, if necessary, longitudinally extending elements, such as grooves or ribs, (not shown), may be provided on the element to increase its resistance to bending loads.

Naturally, in the embodiment of FIGS. 1 and 2, the plastics deformation of the layer 10 is chosen to enable the layer 10 to oppose the bias of the substrate 8. However, where thicker and stronger spring material is used for the substrate 8, additional or alternative means may be required.

FIG. 3 shows a cross-section of a further embodiment of an elongate hollow element 2 shown in its extended tubular form. As previously, this element is in the form of a longitudinally split, substantially circular cross-section, tube 2, and the tube 2 is formed from a substrate 8 of resilient material, such as spring metal, prestressed such that its natural cross-section is circular as shown in FIG. 3. To the inner surface of this substrate 8 are bonded a plurality of longitudinally extending prestressed fibres 12, which fibres are under tension in this extended form of the tube. Accordingly, these tensioned longitudinally extending fibres 12 favour formation of a coil, as 4, in which state the tension in the fibres is at least partially relieved. Similarly, once the tube 2 has been coiled, the tensioned longitudinally extending fibres 12 oppose the unrolling of the coil and therefore ensure that the element is stable in its coiled state. Additionally, or alternatively, the substrate 8 may be provided with means prestressed transversely of the tube 2 to oppose curving of the element into its elongate hollow form. Thus, in the embodiment shown in FIGS. 3 and 4, a number of transversely extending fibres 14 are affixed to the external surface of the substrate 8. These fibres 14 are under tension when the element is in its elongate hollow form, but this tension is at least partially relieved when the element is flattened.

The prestressed fibres 12 and 14 may be prestressed glass or carbon fibres affixed to the substrate. Alternatively, these fibres may be embedded in a respective plastics material layer bonded or otherwise laminated to the substrate 8. In this embodiment, it is helpful if the plastics material layers are also chosen to have suitable plastic deformation characteristics so that they can also act to oppose the bias of the substrate 8 as described above in connection with FIGS. 1 and 2 and thereby to support the action of the fibres 12 and 14 carried by the layers.

Additionally, or alternatively, prestressed graphite bands and/or tensioned bands of rubber or plastics material could be affixed relative to the substrate 8.

The resilient material of the substrate is chosen in accordance with the application and with the rigidity required for the final tube. For example, the substrate could be made of a prestressed plastics material, of spring steel, or of non-ferrous alloys such as beryllium copper. The tube could be produced, for example, on a continuous line basis by die-stamping, cold rolling and induction hardening. Of course, any other techniques which produce a tube with sufficient bias towards its final elongate hollow form and with sufficient rigidity to be self-supporting can be employed.

In the embodiments so far described, the tube 2 has been shown to have a substantially circular cross-section with its longitudinal edges spaced. However, the natural cross-section to which the substrate is biased can be chosen as appropriate. For example, the substrate could be formed to be an arcuate channel member. Alternatively, the longitudinal extending edges of the tube can be arranged to overlap to thereby form a closed tube. Furthermore, whether the tube is closed or open it could be based on an oval or an ellipse rather than on a circle.

FIG. 5 shows a perspective view of an alternative embodiment of an element of the invention in which a substrate 8 as previously is formed such that its natural form is the longitudinally split tube 2 illustrated. This substrate 8 is adhered to an outer layer 16 formed of a number of individual strips 18 of resilient material each prestressed to be under tension transversely of the tube 2 in its extended form illustrated. As previously, the individual strips 18 each oppose the curving of the tube into its hollow extended form illustrated. Furthermore, these strips 18 have a tendency to roll in the direction of winding and therefore aid in the winding of the tube 2 to form a coil. The structure shown in FIG. 5 is a particularly strong and rigid tube 2 which yet can be very easily wound to form a coil.

Of course, either or each of the surfaces of the construction shown in FIG. 5 may be encased in plastics material. Prestressed strips 18 may alternatively be affixed to the internal surface of the substrate 8. Furthermore, the surface of the substrate opposite that to which the strips 18 are attached may be provided with prestressed bands extending and tensioned longitudinally of the tube 2.

In any of the embodiments so far described, where the longitudinal edges of the tube approach, meet or overlap, means may be provided to releasably secure these edges together. An embodiment of a circular cross-section tube 2 provided with co-operable engagement means arranged to fasten the longitudinal edges together is shown in FIG. 6. As is apparent from FIG. 6, one of the longitudinal edges of the tube 2 is provided with a recess 20. The other of the edges is shaped to have a corresponding longitudinally extending projection 22. Because the tube 2 is generally biased by the substrate 8 into this hollow form, in some applications an acceptable joint can be obtained by the simple engagement of the projection 22 in the recess 20, the projection being held in engagement by compression. However, and as shown in FIG. 6, it is generally preferred that co-operating surfaces of the recess 20 and the projection 22 are formed with interengaging means. Thus, and as illustrated, one circumferential surface of the projection 22 is formed with a longitudinally extending recess 24 into which a longitudinally extending lug 26 on the facing circumferential surface of the recess 20 is arranged to engage. The co-operable means 20 and 22 when engaged keep the tubular element under radial compression and therefore improve the rigidity of the tube 2. Generally, a tool, such as a claw, is used to disengage the co-operable means when the tubular element is to be wound to form a coil.

It will be appreciated that other constructions of fastening means may be provided. For example, a series of individual interlocking teeth, rather in the manner of a zip fastener could be provided.

FIG. 7 shows a perspective view of further fastening means in which one longitudinally extending edge of the tube is provided with a number of spaced projections 28 which each engage in a corresponding one of a number of slots 30 spaced along the other longitudinally extending edge of the tube.

It will be appreciated from the above that an element of the present invention is an elongate hollow element which can exhibit considerable structural rigidity. However, when coiled, this element occupies minimal space.

The applications of an element of the invention are numerous. For example, as extended elements can be coiled to take up minimal space, elements of the invention could be utilised to make the transport of elongate elements easier and cheaper. Thus, elongate elements such as pipes, masts and aerials could be arranged to be transported in a coiled state for subsequent erection on site. Alternatively, the element might be intended to be coiled up again after extension for subsequent extension at a later time. For example, the element may form a rigid structural element, such as, a tent pole, a screen support, a support arm or leg, to be extended in use and coiled when not in use. In this case, it would generally be preferred that the element in its coiled condition be retained within a housing.

FIG. 8 shows a section of an embodiment in which the tube 2 is coiled to form the coil 4 which is stored within a housing 32 and which is arranged to be extended or retracted relative to the housing 32 by way of a drive device. In the embodiment illustrated in FIG. 8 the external surface of the tube 2 is provided with a plurality of grooves 34 which extend substantially,parallel and are inclined to the longitudinal extent of the tube 2. A worm gear 36 is arranged to engage with the grooves 34 such that rotation of the worm gear 36 by way of a motor 38 causes the tube 2 to be appropriately extended or retracted as required. Of course, alternative means, for example, such as a handle (not shown) could be provided to rotate the worm gear 36. In the embodiment shown in FIG. 8, the free end of the extended tube 2 is provided with an end cap 40 which acts to prevent the tube 2 as it is extended from becoming twisted.

Of course, other means for driving the tube into its extended form may be provided. For example, the coil 4 may be provided with a driven axle.

It has not previously been practical to repeatedly drive tubes between a coiled and an extended form. FIG. 9a shows schematically from above a coil 104 of a single strip of metal showing the extension therefrom of the tube 102 and indicating the conic shape which the tube naturally tries to take up. FIG. 9b shows schematically from above the tube 102 fed linearly from the coil 104. It will be seen that as the tube 102 is linearly extended it is subjected to strong forces F which try to force the tube 102 to take up the shape of a smooth curve indicated at 42. However, existing thick walled tubes will not transform between the coiled and extended forms, and the forces F cause such tubes to buckle.

It has been possible previously to drive thin walled tubes between the two forms. However, these tubes have had to have very thin walls, for example, of the order of 57 μm thick for a 30 mm diameter tube. An extended length of such a thin walled tube will not resist bending loads, and indeed will not generally be sufficiently rigid to be self-supporting. Furthermore, as the tube is forced to undergo plastic deformation to transform between the two forms, large forces are required to drive the tube. The repeated transitions undergone by the tube will also cause it to fail very quickly.

FIG. 9c shows schematically a perspective view of a tube 2 of the invention which is particularly arranged to be linearly driven and which overcomes the problems described above.

The tube 2 illustrated in FIG. 9c is formed of a plurality of spaced, longitudinally extending metal strips or wires and a plurality of spaced, transversely extending metal strips or wires arranged to form a mesh. As previously, the mesh is biased to form the tube 2. This mesh is covered in a material subject to plastic deformation such that the interstices of the mesh are filled with the material. Not only does this material render the coil 4 stable as previously, it also is able to undergo plastic deformation during the linear driving of the tube 2. This means that the wires forming the mesh substrate are only subjected to linear stresses, whilst the plastic transformation between the two forms occur in the material in the interstices of the mesh.

It will be apparent that the rigid structural tube, as 2, formed by an element of the invention may have a wide variety of applications. If appropriate, electrical conductors, optical fibres and the like may be embedded within or supported on the material forming the tube.

It will also be appreciated that the tube need not be wound to form a coil having a circular periphery. For example, coils having square, rectangular or other peripheral shapes may be employed if required. It would also be possible to wind the tube about more than one transverse axis to produce a compressed condition or, for example, a concertina or other zig-zag shape.

It will be appreciated that modifications and variations to the invention may be made within the scope of the appended claims.

What is claimed is:

1. An element having an elongate hollow form and constructed and arranged to be selectively progressively flattened and wound about an axis extending transversely relative to a longitudinal extent of said elongate hollow form to define a compressed, wound form, wherein said element comprises first and second laminated layers affixed together so that said element comprises a unitary composite element, said first layer of said unitary composite element comprising a resilient substrate which is biased to said elongate hollow form, and said second layer of said unitary composite element being arranged to oppose the bias of the substrate upon adoption of the compressed, wound form, and wherein the elongate hollow form and the compressed, wound form of said unitary composite element are reversible and are both stable forms.

2. An element according to claim 1, wherein in its elongate hollow form the element has sufficient rigidity to be self-supporting.

3. An element according to claim 2, wherein said second layer affixed to the substrate is of a material which is subject to plastic deformation.

4. An element according to claim 3, wherein said layer is of a plastics material laminated with said substrate.

5. An element according to claim 1, wherein said second layer affixed to the substrate comprises prestressing means prestressed longitudinally of the element to favour formation of the compressed, wound form.

6. An element according to claim 5, wherein said prestressing means comprises at least one member extending longitudinally of the element which is under tension when the element is in its elongate hollow form, which tension is at least partially relieved upon the element adopting its compressed condition.

7. An element according to claim 6, wherein said prestressing means comprises longitudinally extending prestressed fibres, such as glass or carbon fibres.

8. An element according to claim 7, wherein said second layer comprises a layer of plastic material reinforced by said longitudinal prestressed fibres, said layer of reinforced plastics material being laminated with said substrate.

9. An element according to claim 1, further comprising means provided on said substrate pre-stressed transversely of the element to oppose curving of the flattened element into its elongate hollow form.

10. An element according to claim 9, wherein said means opposing curving of the element comprises members extending transversely of the element which are under tension when the element is in its elongate hollow form, which tension is at least partially relieved when the element is flattened.

11. An element according to claim 10, wherein said transversely extending members are prestressed fibres, such as glass or carbon fibres.

12. An element according to claim 11, wherein said second layer comprises a layer of plastics material reinforced by said transverse prestressed fibres, said layer of transversely reinforced plastics material being laminated with said substrate.

13. An element according to claim 10, wherein said transversely extending members are elongate strips of resilient material.

14. An element according to claim 13, wherein said transversely extending elongate strips are strips of mesh or spring metal.

15. An element according to claim 1, wherein said substrate is a strip of mesh or spring metal.

16. An element according to claim 1, which in said elongate hollow form is in the form of a longitudinally split tube, and further comprising co-oparable means on the adjacent longitudinally extending edges of the tube arranged to releasably secure said edges.

17. An element according to claim 16, wherein said co-operable means comprise a longitudinally extending recess formed in one of said edges and a corresponding longitudinally extending projection on the other of said edges, and wherein co-operating surfaces of said recess and projection are formed with interengaging means.

18. An elongate element according to claim 1, further comprising longitudinally extending formations on the element, such as grooves or ribs, to increase the resistance of the element to bending loads.

19. An element according to claim 5, wherein said substrate is a strip of mesh or spring metal.

20. An element according to claim 9, wherein said substrate is a strip of mesh or spring metal.

21. A portable structural element comprising a housing and an elongate element, the element having an elongate hollow form and constructed and arranged to be selectively progressively flattened and wound about an axis extending transversely relative to a longitudinal extent of said elongate hollow form to define a compressed, wound form, wherein said element comprises first and second laminated layers affixed together, said first layer comprising a resilient substrate which is biased to said elongate hollow form and said second layer is affixed to said substrate and opposes the bias of the substrate upon adoption of the compressed, wound form, and wherein the elongate hollow form and compressed, wound form of said element are reversible and are both stable forms, and wherein the element wound into its compressed, wound form is received within said housing.

* * * * *